(No Model.)
T. McGOWAN.
STILL FOR THE DISTILLATION AND PURIFICATION OF HYDROCARBONS.
No. 492,421. Patented Feb. 28, 1893.
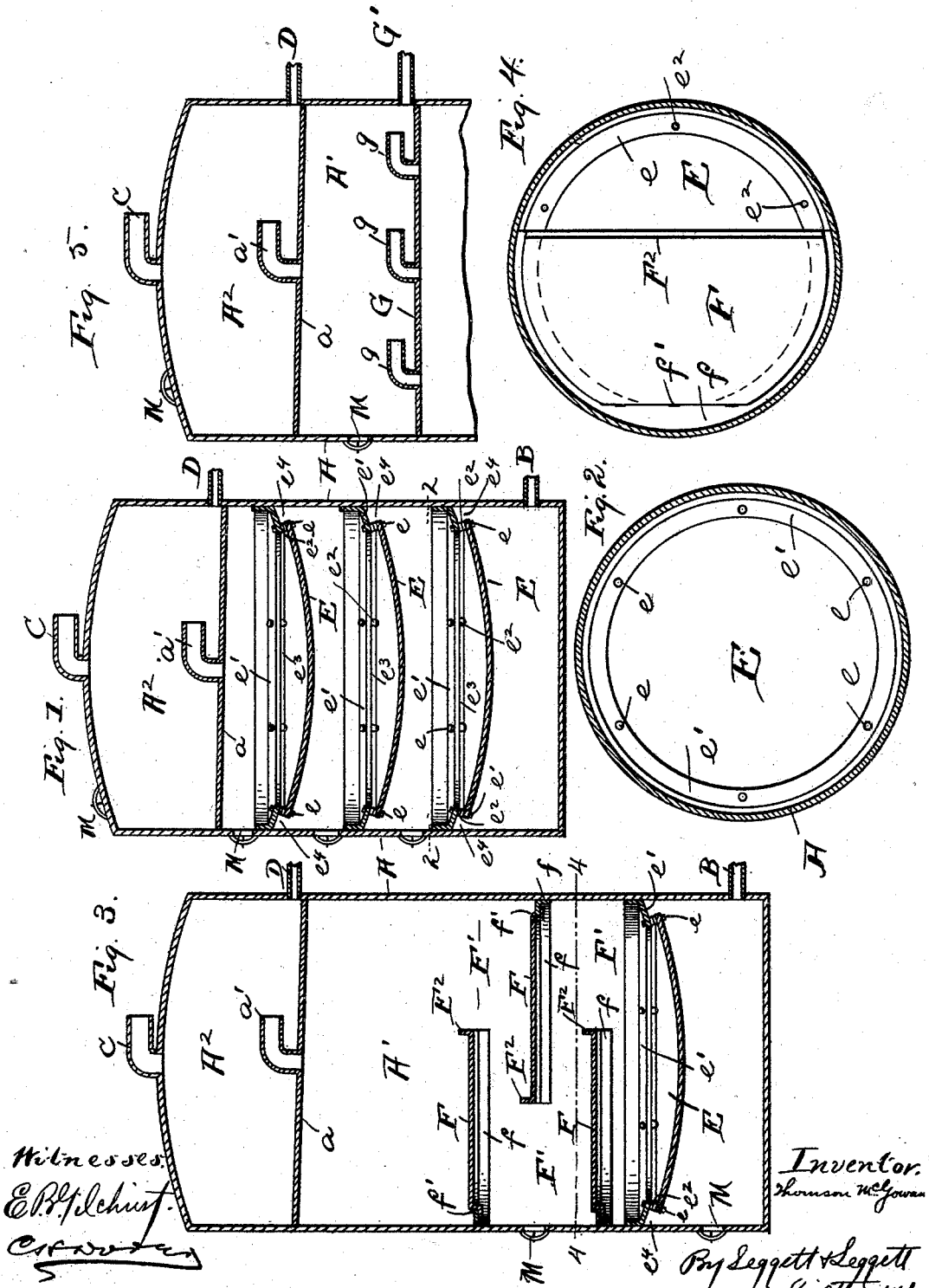

UNITED STATES PATENT OFFICE.

THOMSON McGOWAN, OF CLEVELAND, OHIO.

STILL FOR THE DISTILLATION AND PURIFICATION OF HYDROCARBONS.

SPECIFICATION forming part of Letters Patent No. 492,421, dated February 28, 1893.

Application filed July 7, 1892. Serial No. 439,274. (No model.)

*To all whom it may concern:*

Be it known that I, THOMSON MCGOWAN, of Cleveland, in the county of Cuyahoga and State of Ohio, have invented certain new and useful Improvements in Stills for the Distillation and Purification of Hydrocarbons; and I do hereby declare the following to be a full, clear, and exact description of the invention, such as will enable others skilled in the art to which it pertains to make and use the same.

My invention relates to improvements in stills for the distillation and purification of hydrocarbons, more especially crude-petroleum.

The means heretofore employed for supporting the purifying substance, especially when the latter was of a fine or powder-like character was objectionable in that during the process of distillation and purification, more or less of the purifying substance was liable to become displaced and fall or drop upon the bottom of the still. The bottom of the still being directly exposed to the fire of the furnace any purifying substance dropping upon it as aforesaid, would coke upon the bottom, resulting in the burning out of the latter, and great care had to be exercised to guard against and preclude serious results or accidents.

My invention therefore particularly consists in the means employed for supporting the purifying substance in the still without liability of any particles thereof to become displaced so as to fall or drop onto the bottom of the still.

My invention also consists in certain features of construction and in combination of parts hereinafter described and pointed out in the claims.

In the accompanying drawings, Figure 1 is a central vertical section of an upright cylindrical still embodying my invention. Fig. 2 is a top plan in section on line 2—2, Fig. 1. Fig. 3 is a central vertical section of a still exhibiting slight modifications, and Fig. 4 is a top plan in section on line 4—4, Fig. 3. Fig. 5 is a central vertical section of a portion of a still exhibiting a slight modification also within the scope of my invention.

Referring to the drawings, A represents a still that comprises two compartments, A' and $A^2$, separated by an inclined diaphragm or partition $a$. Compartment A' is adapted to receive the hydrocarbon to be distilled and purified, and B represents the pipe for charging the still. Diaphragm $a$ is provided with a bent tube, $a'$, for affording exit to the vapors generated in the distillation of the oil or substance in compartment A'.

C represents a pipe for conducting off the vapors from compartment $A^2$ to an ordinary condenser (not shown) and D represents a pipe for conducting to said condenser any liquid arising from the condensation of vapors in said compartment of the still.

Referring to Fig. 1 of the drawings, E represents diaphragms or shelves located at different elevations and at suitable intervals apart within compartment A' of the still, said diaphragms or shelves being adapted to support the purifying substance P employed to free of impurities the hydrocarbon undergoing distillation. Diaphragms or shelves E are imperforate and dish-shaped as shown and suspended, preferably by means of bolts $e$, from an inwardly-projecting annular flange or angle-iron frame secured to the sides of the still, flange $e'$ lapping by the edge of the shelf or diaphragm. Suitable means, such for instance, as washers, $e^2$, are mounted on the bolts between supporting-flange or frame $e'$ and the respective dish-shaped diaphragm or shelf, forming openings $e^3$, between supporting-flange or frame $e'$ and the shelf or diaphragm. As soon as the oil or substance undergoing distillation vaporizes, the impurities are attacked by the purifying substance upon the diaphragm next below, the purified vapors ascending through annular opening $e^4$ at the edge of the shelf or diaphragm next above and thence passing through the respective openings $e^3$ over the purifying substance on said last-mentioned shelf or diaphragm, and so on up through compartment A' of the still. The vapors generated below the lowermost shelf or diaphragm ascend through the annular opening $e^4$ at the edge of said shelf or diaphragm and thence through the respective openings $e^3$ over the purifying substance on said shelf or diaphragm where they are freed of their impurities, the purified vapors, as already indicated, passing through bent tube $a'$ from compartment A' to compartment $A^2$ of the still.

By means of the construction just described, it is quite obvious that there is no possibility of any of the purifying substance working itself over the edges of the diaphragms or shelves and falling or dropping therefrom. Of course, it will be understood that it is only necessary to provide suitable means for preventing the falling or dropping of purifying substance from the lowermost diaphragm, as it does not matter so much if the purifying substance does become displaced from the diaphragms or shelves above and drop or fall onto the shelf or diaphragm next below, but even if no means were employed for preventing the dislodgment of particles or pieces of purifying substance from the shelves or diaphragms above the lowermost shelf or diaphragm, by employing the construction of and support for the lowermost shelf or diaphragm hereinbefore described, annular flange $e'$ of said construction would arrest any particles or pieces of the purifying material falling or dropping at the side of the still, from a shelf or diaphragm above and thereby prevent the matter thus dislodged from dropping or falling through opening $e^4$ to the bottom of the still.

M represents man-holes for access to the interior of the still.

Modifications within the scope of my invention are shown in Figs. 3, 4, and 5.

In Fig. 3, F represents shelves or diaphragms for supporting the purifying substance, the same being flat and horizontal, and supported at the side of the still preferably by an angle-iron frame $f$ secured to the still, the diaphragms preferably resting on top of the supporting-angle-iron, and hinged thereto, as at $f'$. The vapors from the oil or substance undergoing distillation below ascend through the opening F' at the free end of the shelf or diaphragm and pass over the purifying substance on said shelf or diaphragm. In this case the arrangement of shelves or diaphragms is preferably as shown in Fig. 3, wherein alternate shelves or diaphragms are secured at opposite sides of the still, respectively, with their free ends lapping by each other as shown. Shelves or diaphragms F at their free ends have preferably an upwardly-projecting flange $F^2$ for preventing the self-dislodgment of material. In the case illustrated in Fig. 3, as shown in said figure, I prefer to employ for the lowermost shelf or diaphragm, the construction disclosed in Figs. 1 and 2, and if such is employed it does not matter much whether shelves or diaphragms F are or are not provided with upturned flanges $F^2$ aforesaid.

The modification shown in Fig. 5 is more especially adapted for use in a still for continuous distillation, and wherein a liquid purifier would be employed.

G represents a shelf or diaphragm for supporting the purifying substance, the same covering the entire transverse area of the still, and being provided with bent tubes $g$, the vapors generated below passing through said tubes and thence over the liquid purifier, the bent tubes preventing ingress of the liquid purifier into the still below.

G' represents a pipe for supplying the still with the liquid purifier, the same discharging onto shelf or diaphragm G.

What I claim is—

1. In a still for the distillation and purification of hydrocarbons, the combination with a still body or shell, of shelf or diaphragm for supporting purifying material, circuitous passages formed for the distillates to pass through, said passages covered or constructed in such a manner that particles dropping from above them are prevented from dropping through them, substantially as set forth.

2. In a still for the distillation and purification of hydrocarbons, the combination with the still body or shell, of shelves or diaphragms located one above another and provided with openings or passages covered or constructed in such a manner that particles dropping from above them are prevented from dropping through them, substantially as set forth.

3. The combination with a still body or shell, of shelves or diaphragms having openings constructed to admit of an upward passage of material but to prevent a vertical downward passage therethrough, substantially as set forth.

4. The combination with a still body or shell, of shelf or diaphragm located transversely of the still, and flange overlapping the edges of the shelf or diaphragm and slightly removed therefrom whereby a lateral opening is formed beneath the flange, substantially as set forth.

In testimony whereof I sign this specification, in the presence of two witnesses, this 16th day of June, 1892.

THOMSON McGOWAN.

Witnesses:
C. H. DORER,
WARD HOOVER.